United States Patent

Chen et al.

[11] Patent Number: 5,572,185
[45] Date of Patent: Nov. 5, 1996

[54] CAR ALARM HAVING A SOFT CHIRP ARMING SIGNAL

[75] Inventors: Chau-ho Chen; Chih-hung Shee, both of Hsin Tien, Taiwan

[73] Assignee: Nutek Corporation, Taipei, Taiwan

[21] Appl. No.: 400,176

[22] Filed: Mar. 6, 1995

Related U.S. Application Data

[63] Continuation of Ser. No. 503, Jan. 5, 1993, abandoned.

[51] Int. Cl.[6] ........................................... B60R 25/00
[52] U.S. Cl. ................. 340/425.5; 340/426; 340/692; 307/10.2
[58] Field of Search ..................... 340/425.5, 426, 340/692; 307/10.2

[56] References Cited

U.S. PATENT DOCUMENTS

| 4,885,572 | 12/1989 | Iwata et al. | 340/425.5 |
| 4,996,515 | 2/1991 | Schaffer et al. | 340/426 |
| 5,382,941 | 1/1995 | Arzoumanian et al. | 340/425.5 |

OTHER PUBLICATIONS

Digital Volume Control, "Elector Electronics", Dec. 1990 p. 40.

Primary Examiner—Jeffery Hofsass
Assistant Examiner—Edward Lefkowitz
Attorney, Agent, or Firm—Graham & James LLP

[57] ABSTRACT

An electronic anti-theft system for vehicles having a common signal generator and speaker for both the alarm siren and the arming chirp, in which the volume of the arming or disarming chirp can be set to a desired level. A control circuit is detailed which allows the volume of the arming chirp to be attenuated.

9 Claims, 2 Drawing Sheets

1

CAR ALARM HAVING A SOFT CHIRP ARMING SIGNAL

This is a continuation of application Ser. No. 08/000,503 filed on Jan. 5, 1993, now abandoned.

FIELD OF THE INVENTION

The present invention is related to vehicular anti-theft devices and more particularly to a circuit for attenuating the siren volume of an electronic alarm during arming and disarming of the system.

BACKGROUND OF THE INVENTION

Devices for deterring vehicular theft and/or vandalism are known in the prior art. Included are electronic alarms which are activated if the vehicle is tampered with or otherwise disturbed by an unauthorized person. When the electronic alarm is operated, a siren or other sound generating device is used to create a high volume sound to scare away the intruder. This sound should be as loud as possible in order to maximize its effectiveness.

Many existing electronic alarms can be armed remotely using a radio-operated arming device. These remotely armed electronic alarms typically provide an audible "chirp" to indicate that the system has been properly armed or disarmed. The audible chirp is typically generated by the same siren or sound generating device that is used to create the primary alarm sound. Thus, the volume of the chirp is the same as the primary alarm sound. Having the arming chirp broadcast at a load volume can be annoying, particularly when arming or disarming the system at night or in noise-sensitive locations.

SUMMARY OF THE INVENTION

The present invention is directed to an electronic anti-theft system for vehicles having a common signal generator and speaker means for both the alarm siren and the arming chirp, in which the volume of the arming or disarming chirp can be set to a desired level. In accordance with the preferred embodiment, a control circuit is provided which allows the volume of the chirp to be attenuated. The control circuit includes a triggering circuit, a chirp control timer, a selector switch, a latch, a variable resistor and a control driver. The triggering circuit determines the length of time of the chirp and turns on the chirp control timer for that length of time. The output of the chirp control circuit is held by the latch circuit which provides an input to the control driver. The control driver drives the output speaker through the variable resistor which determines the volume of the chirp. When the chirp duration time has elapsed, the output is turned off, thereby turning off the chirp.

DETAILED DESCRIPTION OF THE PREFERRED EMBODIMENT

Figure 1:
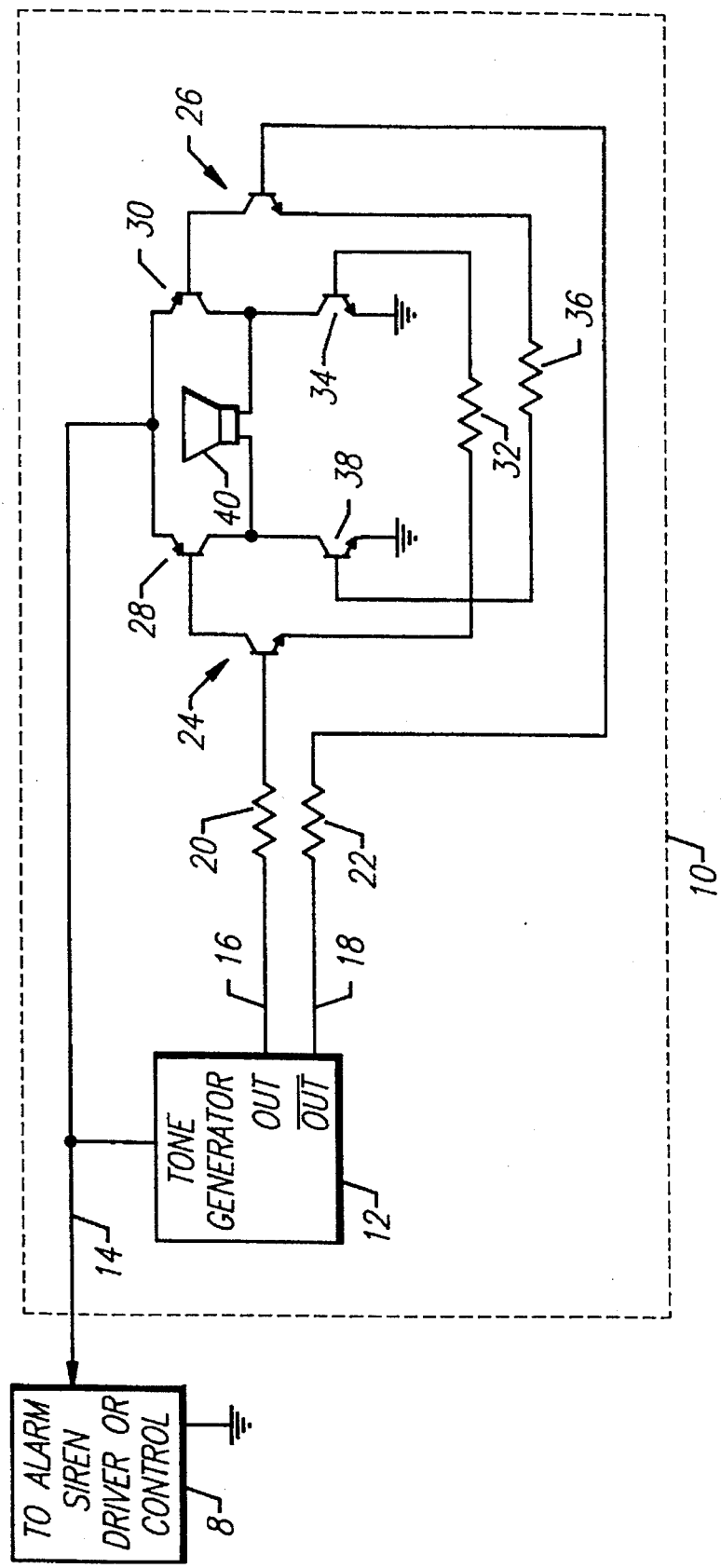
FIG. 1 is a schematic diagram of a prior art tone control circuit for use with an electronic alarm system.

FIG. 1 is a schematic diagram of a vehicular electronic alarm system 6 having an alarm system sensor means 8 for sensing at least one environmental parameter and for directing electrical power to a tone control generation circuit 10.

The tone control generation circuit 10 includes a tone generator 12 having an input connected to the alarm system sensor means 8 by an alarm siren control path 14. The tone control generation circuit 10 also includes a plurality of solid state switches, which may be, for example, field effect transistors (FET's) or NPN/PNP transistors. For purposes of the present discussion, the plurality of solid state switches includes a first pair of NPN transistors 24 and 26, a pair of PNP transistors 28 and 30, and a second pair of NPN transistors 34 and 38, as well as resistors 32 and 36 which combine to control a speaker means 40.

To control the speaker means 40 in response to a power signal from the alarm siren control path 14, the tone generator 12 produces a speaker control signal on an output 16 and a complementary output 18. The outputs 16 and 18 of the tone generator 12 are connected through respective resistors 20 and 22 to provide input control signals to the bases of the first pair of NPN transistors 24 and 26, to control the conductive state of the first pair of NPN transistors 24 and 26. In addition to providing a power signal to the tone generator 12, the alarm siren control path 14 simultaneously provides a driving voltage to the emitters of PNP transistors 28 and 30 during sound generation.

The collectors of the first pair of NPN transistors 24 and 26 are connected to the respective bases of PNP transistors 28 and 30, while the emitters of the first pair of NPN transistors 24 and 26 are connected through resistors 32 and 36 to the bases of the second pair of NPN transistors 34 and 38. In addition, the collectors of PNP transistors 28 and 30 are connected to the respective collectors of the second pair of NPN transistors 34 and 38, as well as to an input/output of the sound generating device 40. Finally, the emitters of the second pair of NPN transistors 34 and 38 are connected to ground.

The tone control generation circuit 10 of FIG. 1 operates as follows. When an alarm signal is to be generated, or when the system is armed or disarmed, a power on signal is transmitted via alarm siren control path 14 to tone generator 12 and to the emitters of PNP transistors 28 and 30. In response to the signal, tone generator 12 alternately turns on outputs 16 and 18 (i.e., when output 16 is turned on, output 18 is turned off and vice-versa).

When the output 16 is turned on, a voltage is applied to the base of transistor 24 which allows a current to flow from the transistor's collector to the transistor's emitter, thereby applying a voltage to the bases of the transistors 28 and 34. When transistors 28 and 34 are turned on, a current flows from control path 14 through sound generating device 40 to ground.

Similarly, when the complementary output 18 is turned on, a voltage is applied to the base of transistor 26 which allows a current to flow from the transistor's collector to the transistor's emitter, thereby applying a voltage to the bases of the transistors 30 and 38. When transistors 26, 30 and 38 are turned on, a current flows from control path 14 through sound generating device 40 to ground, in an opposite direction through the sound generating device 40 from when the transistor's 24, 28 and 34 are turned on.

To produce a alarm siren, the tone generator 12 rapidly cycles the "on" state of the output 16 and complimentary output 18, and thus also their corresponding sets of transistors, in order to generate an alternating current through the sound generating device 40. The alarm siren is preferably connected to a shutoff timer which is incorporated into the tone generator 12, to stop the alarm siren after a predetermined fixed interval.

The vehicular alarm system 6 preferably also includes the capability of producing an audible "chirp" which is a very short duration cycling of the tone generator 12 whenever the system 6 is turned on, i.e. armed, or turned off, i.e. disarmed. The arming chirp utilizes the same components required for the alarm signal as described above, with the timing duration decreased to a fraction of a second.

Figure 2:
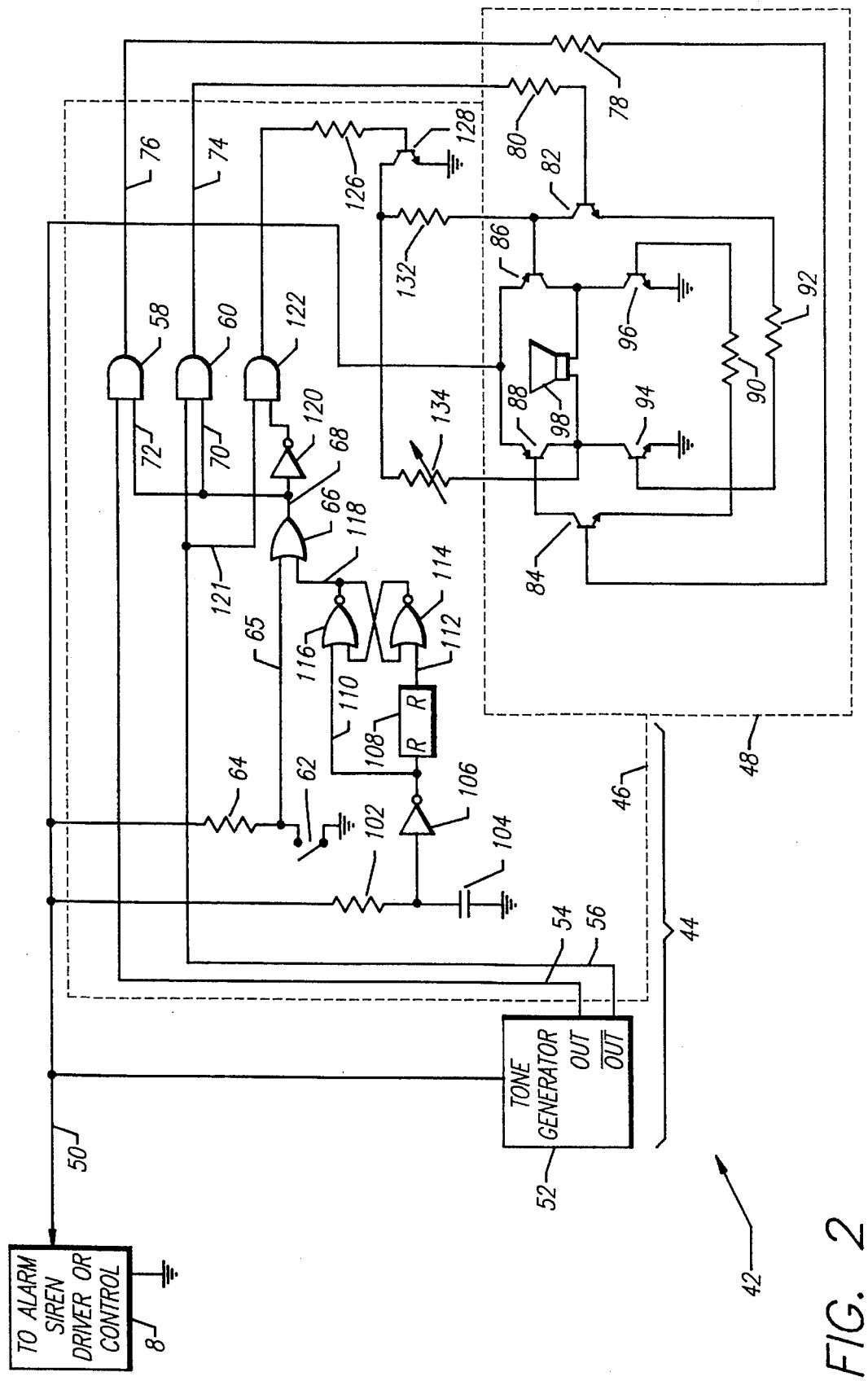
FIG. 2 is a schematic diagram of an electronic alarm tone control circuit in accordance with the present invention.

FIG. 2 depicts a schematic diagram of an electronic vehicular alarm system 42 of the present invention having an alarm system sensor means 8, such as that of FIG. 1, for sensing at least one environmental parameter and for directing electrical power to a tone control circuit 44. The tone control circuit 44 includes a volume control circuit 46 and a sound generation circuit 48. The tone control circuit 44 also includes a tone generator 52 which generates a pair of complementary outputs 54, 56 to the volume control circuit 46. Thus the tone generator 52 receives an input from the system sensor means 8 via an alarm siren control path 50, and produces an output 54 and a complementary output 56, both of which are directed to the volume control circuit 46.

The primary functional elements of the volume control circuit 46 include AND gates 58, 60 and 122, OR gate 66, inverters 106 and 120, NAND gates 114 and 116 and chirp timer control circuit 108. Also included are resistors 64, 102, 126 and 132, capacitor 104, switch 62, transistor 128 and variable resistor 134. These elements are combined to reduce the sound generation power during arming and/or disarming, while providing normal power during alarm operation.

Each of the AND gates, OR gates, and NAND gates of the volume control circuit 46 have two (i.e. first and second) inputs and one output, while the inverters each have one input and one output. The chirp timer control circuit 108 also has an input and an output. The control path 50 is connected through resistor 102 and inverter 106 to the input of chirp timer control circuit 108. The input of inverter 106 is also connected through capacitor 104 to ground. The combination of resistor 102, capacitor 104 and invertor 106 forms a triggering circuit which turns on chirp timer control circuit 108 when a voltage is received from control path 50.

NAND gates 114 and 116 are connected to form a latch circuit. The output 112 of chirp timer control circuit 108 is connected to one input of NAND gate 114, while the output of inverter 106 is also connected to one input of second NAND gate 116. The output of the latch circuit formed by NAND gates 114 and 116 is connected to one input of OR gate 66. The output of OR gate 66 is connected to the input of inverter 120, while the output of inverter 120 is connected to one input of AND gate 122. The output of AND gate 122 is connected through resistor 126 to the base of transistor 128, with the collector of transistor 128 being connected through resistor 132 to the base of transistor 86, and through variable resistor 134 to the collector of transistor 88. The emitter of transistor 128 is connected to ground.

The outputs 54 and 56 of tone generator 52 are each connected to one input of AND gates 58 and 60. Output 56 is also connected to one input of AND gate 122. Within the volume control circuit 46, control path 50 is also connected through resistor 64 to an input 65 of OR gate 66, with the same input 65 of OR gate 66 being connected through switching 62 to ground. The output 68 of OR gate 66 is connected to both of the other inputs of AND gates 58 and 60.

The functional elements of the sound generation circuit 48 are generally identical to the corresponding components of the tone control generation circuit 10 discussed above and depicted in FIG. 1. Thus, the alarm control circuit 44 includes resistors 78, 80, 90 and 92, a plurality of solid-state switches, preferably solid-state switching elements such as FETs or NPN/PNP transistors, and a speaker device 98.

For purposes of the present discussion of the preferred embodiment, the plurality of solid-state switches of the alarm control circuit 44 include NPN transistors 82, 84, 94 and 96, and PNP transistors 86 and 88. However, it is to be understood that other equivalent switching devices and any additional circuitry required for their operation will be readily ascertainable to those skilled in the art. In addition, those skilled in the art will appreciate that each of the NPN and PNP transistors has a base, an emitter and a collector.

Outputs 74 and 76 of AND gates 58 and 60 of volume control circuit 46 are directed to the alarm control circuit 46, where they are connected through respective resistors 78 and 80 to the bases of NPN transistors 82 and 84. The collectors of NPN transistors 82 and 84 are connected to the respective bases of PNP transistors 86 and 88, while the emitters of NPN transistors 82 and 84 are connected through resistors 90 and 92 to the bases of NPN transistors 94 and 96. The emitters of PNP transistors 86 and 88 are connected to control path 50 which provides a driving voltage during sound generation. The collectors of PNP transistors 86 and 88 are connected to the respective collectors of NPN transistors 96 and 94, with the emitters of NPN transistors 96 and 94 being connected to a ground. Additionally, the speaker device 98 is connected to the collectors of PNP transistors 86 and 88.

The circuit of FIG. 2 operates as follows. During arming or disarming, switch 62 is closed and a "chirp" signal is transmitted via control path 50 to input 49 of tone generator 52. The "chirp" signal from the control path 50 is also directed to the input of chirp timer control circuit 108 through the triggering circuit consisting of resistor 102, capacitor 104 and inverter 106. In addition, the "chirp" signal from the control path 50 is also directed to the emitters of PNP transistors 86 and 88. At the same time, switch 62 is closed so that the input 65 of OR gate 66 is grounded. Thus, the output of OR gate 66 is the "chirp" signal, which is cutoff by the chirp control timer 108 after an appropriate brief interval, dropping the output of the OR gate 66 to zero.

During a "chirp" signal tone generation, the outputs 54 and 56 pass through AND gates 58 and 60 only while chirp timer control circuit 108 is turned on and the output of OR gate 66 is the "chirp" signal. When the output of OR gate 66 drops to zero, the inputs 70 and 72 to the AND gates 60 and 58 respectively are zero and thus the AND gates 58 and 60 do not forward the outputs 54 and 56.

Additionally, transistor 128 is turned on to direct the current flow from speaker device 98 through the variable resistor 134 to ground. Interconnecting the speaker device 98 and the variable resistor 134 in series reduces the total current flow through speaker device 98, thus reducing the volume of the sound during chirp generation. Accordingly, the volume of the chirp can be reduced by increasing the resistance of the variable resistor 134.

A variable resistor is preferred to allow the installer of the system to set an appropriate chirp volume, or to allow the user to easily control the chirp volume. However, it should be apparent that a fixed value resistor could be used in place of the variable resistor 134.

When an alarm signal is to be generated, switch 62 is opened and an "alarm" signal is transmitted via control path 50 to input 49 of tone generator 52. The "alarm" signal is also transmitted via control path 50 to the input of chirp control timer through the triggering circuit consisting of resistor 102, capacitor 104 and first inverter 106. In addition, the "alarm" signal is transmitted via control path 50 to one input of OR gate 66 and to the emitters of PNP transistors 86 and 88.

During an "alarm" signal tone generation, switch 62 is opened and the output of the OR gate 66 will be the "alarm" signal, via resistor 64 and input 65, which is not terminated by the chirp control timer 108. Accordingly, the outputs 54 and 56 of tone generator 52 are continuously transmitted through AND gates 58 and 60 to form corresponding signals 76 and 74 until the "alarm" signal terminates.

During either chirp or alarm signal generation, tone generator 52 alternately turns on outputs 54 and 56 which are transmitted through AND gates 58 and 60 to form drive signals 76 and 74 for the duration of the "chirp" signal or "alarm" signal. When drive signal 74 is turned on, a voltage is applied through resistor 78 to the respective base of transistor 82 which allows a current to flow from the collector to the emitter. The output of the emitter of transistor 82 applies a voltage to the bases of transistors 86 and 94. When transistors 86 and 94 are turned on, a current flows from control path 50 through speaker device 98 to ground.

Similarly, when drive signal 76 is turned on, a voltage is applied through resistor 80 to the respective base of transistor 84 which allows a current to flow from the collector to the emitter. The output of the emitter of transistor 84 applies a voltage to the respective bases of transistors 88 and 96. When transistors 88 and 96 are turned on, a current flows from control path 50 through speaker device 98 to ground, in a direction through the speaker opposite to that of when drive signal 74 is turned on.

The on state of the outputs 54 and 56 are rapidly cycled by the tone generator 52 to rapidly reverse the current flow through the speaker device 98, thus generating the chirp or alarm sound. As discussed above, when an arming chirp is being produced by the speaker device 98, the variable resistor is placed in series with the speaker device 98. By comparison, when an alarm siren is being produced, the variable resistor is not serially connected to the speaker device 98, and therefor the maximum current is available to drive the speaker device 98.

The foregoing description of the present invention is of a preferred embodiment which may be subject to a number of modifications without departing from the spirit and scope of the invention. Accordingly, the foregoing description of the preferred embodiment should only be viewed as illustrative, and the scope of the invention is to be limited only by the proper literal and equivalent interpretation of the appended claims.

We claim:

1. A vehicular alarm system comprising:
   signal generator means for producing a first speaker control signal and a second speaker control signal;
   speaker means for producing an audible tone in response to said first speaker control signal and said second speaker control signal from said signal generator means;
   sensor means for sensing at least one environmental parameter and for directing power to said signal generator means and to said speaker means via said circuitry means; and
   circuitry means for interconnecting said signal generator means and said speaker means, and for selectively reducing the volume of said audible tone produced by said speaker means, wherein said circuitry means includes a volume control circuit having a first amplifier circuit for providing an arm/disarm signal to said speaker means in response to said first speaker control signal from said signal generator means and a second amplifier circuit for providing an alarm signal to said speaker means in response to said first speaker control signal and said second speaker control signal from said signal generator means, wherein said speaker means provides an arm/disarm sound in response to said arm/disarm signal and an alarm sound in response to said sensor means.

2. The vehicular alarm system of claim 1 wherein the first amplifier circuit comprises means for selectively connecting a resistor in series with said speaker means.

3. The vehicular alarm system of claim 2 wherein the first amplifier circuit further comprises:
   timer means for controlling the duration of the arm/disarm signal.

4. A vehicular alarm system comprising:
   sound generator means for broadcasting audible sounds;
   tone generator means for providing a first tone generator output and a second tone generator output;
   volume control means for generating an alarm signal and an adjustable arm/disarm signal;
   sensor means for sensing at least one environmental parameter and for directing power from an output to said tone generator means, said sound generator means, and said volume control means;
   said volume control means includes:
      a first amplifier circuit for providing an arm/disarm signal to said sound generator means in correspondence with said first tone generator output; and
      a second amplifier circuit for providing an alarm signal to said sound generator means in correspondence with said first tone generator output and said second tone generator output,
   said sound generator means providing an alarm sound in response to said alarm signal and said output from said sensor means, and an arm/disarm sound in response to said arm/disarm signal and said output from said sensor means.

5. The vehicular alarm system of claim 4, wherein said first amplifier circuit further comprising at least one variable resistor to permit the arm/disarm signal to be selectively variable so that said sound generator means provides a selectively variable arm/disarm sound in response to said selectively variable arm/disarm signal.

6. The vehicular alarm system of claim 4, said first amplifier circuit further comprising:
   a switching means having a switching means output; and
   a timing means having a time-limited output, wherein when said switching means is closed, said arm/disarm signal is provided to said sound generator means for the duration of the time-limited output and said alarm signal is disabled for the duration of the time-limited output.

7. A vehicular alarm system comprising:
   a sound generation circuit for broadcasting audible sounds;
   a tone generator for providing a first tone generator output and a second tone generator output;
   a volume control circuit for generating an alarm signal and an adjustable arm/disarm signal;
   a sensor for sensing at least one environmental parameter and for directing power from an output to said tone generator, said sound generation circuit, and said volume control circuit, wherein said volume control circuit comprises:
- a first amplifier circuit for providing an arm/disarm signal to said sound generation circuit in correspondence with said first tone generator output; and
- a second amplifier circuit for providing an alarm signal to said sound generation circuit in correspondence with said first tone generator output and said second tone generator output, wherein said sound generation circuit provides an alarm sound in response to said alarm signal and said output from said sensor, and an arm/disarm sound in response to said arm/disarm signal and said output from said sensor.

8. The vehicular alarm system of claim 4, said first amplifier circuit further comprising at least one variable resistor to permit the arm/disarm signal to be selectively variable, wherein said sound generation circuit provides a selectively variable arm/disarm sound in response to said selectively variable arm/disarm signal.

9. The vehicular alarm system of claim 4, said first amplifier circuit further comprising:
- a switch having an output; and
- a timing circuit having a time-limited output, wherein when said switch is closed, said arm/disarm signal is provided to said sound generation circuit for the duration of the time-limited output and said alarm signal is disabled for the duration of the time-limited output.

* * * * *